(12) United States Patent
Daqoa et al.

(10) Patent No.: US 6,445,080 B1
(45) Date of Patent: Sep. 3, 2002

(54) ELECTRIC VEHICLE

(75) Inventors: Naser Abu Daqoa, Stuttgart; Gerhard Stotz, Metzingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/359,430

(22) Filed: Jul. 22, 1999

(30) Foreign Application Priority Data

Jul. 22, 1998 (DE) .......................................... 198 32 873

(51) Int. Cl.[7] .................................................. B60K 1/04
(52) U.S. Cl. ........................................ 307/9.1; 307/10.1
(58) Field of Search ........................ 307/9.1, 150, 10.1; 180/65.1, 65.2, 65.3, 65.8, 68.5; 701/22

(56) References Cited

U.S. PATENT DOCUMENTS

| | | | |
|---|---|---|---|
| 4,592,436 A | * | 6/1986 | Tomei .................. 180/65.3 |
| 5,212,431 A | | 5/1993 | Origuchi et al. ............ 318/139 |
| 5,746,283 A | | 5/1998 | Brighton .................. 180/65.3 |

* cited by examiner

*Primary Examiner*—Fritz Fleming
(74) *Attorney, Agent, or Firm*—Crowell & Moring LLP

(57) ABSTRACT

An electric vehicle has one or several separate energy supply units for supplying electric energy for the energy supply of the electric vehicle. At least one energy supply unit is removably arranged as a compact module on the vehicle roof.

13 Claims, 2 Drawing Sheets

ELECTRIC VEHICLE

BACKGROUND AND SUMMARY OF THE INVENTION

This application claims the priority of German patent document 198 32 873.7, filed Jul. 22, 1998, the disclosure of which is expressly incorporated by reference herein.

The invention relates to an electric vehicle having one or more separate electric energy supply units.

Electrically driven vehicles are very suitable for short-distance transport, for example, in city traffic. A disadvantage of such vehicles relative to those having internal-combustion engines is their smaller range.

In order to increase the range of electric vehicles, German Patent Document DE 195 09 625 A1 describes an electric car with a single-axle trailer, which houses a separate energy supply unit, for example, having a fuel cell, a battery or a generator. Such an arrangement, however, has the following disadvantages:

high carried mass which limits the range of the electric vehicle;

limited maneuverability; and limited speed.

It is an object of the invention to provide an improved electric vehicle, having an increased range.

This and other objects and advantages are achieved by the vehicle energy supply arrangement according to the invention, in which at least one of the units which supply electric energy, particularly for driving the electric vehicle, is detachably arranged as a compact module on the vehicle roof. The energy supply unit arranged on the vehicle roof may particularly be a supplementary energy supply unit which exists in addition to the main supply unit situated in the interior of the vehicle. When required (if, for example, a long-distance drive is planned), the supplementary energy supply unit can be mounted on the vehicle, to permit an increased range of the electric vehicle. Because of the good accessibility of the energy supply unit on the vehicle roof, it can be mounted and removed rapidly, without high expenditures.

In addition to being used specifically for increasing the range, the energy supply unit arranged on the roof may also be the single energy supply unit of the electric vehicle.

If the energy supply is exhausted, the whole energy supply unit or only its components, such as a battery, may be exchanged. Moreover, in the case of constructions with liquid or gaseous fuels, they can be refueled at gas stations without having to exchange the energy supply unit itself.

With regard in particular to German Patent Document DE 195 09 625 A1 referred to above, the vehicle according to the invention has the following advantages:

the vehicle has no speed limitation;

the vehicle maneuverability is not limited;

there is improved parking space utilization for the vehicle;

it requires small additionally carried mass;

it results in increased crash safety;

no official permit is required;

no additional devices on the vehicle are required with respect to traffic safety according to Motor Vehicle Traffic Regulations;

there is cooling of individual components of the energy supply unit while utilizing the air stream; and there are simple and space-saving storage possibilities of the energy supply unit removed from the vehicle.

Other objects, advantages and novel features of the present invention will become apparent from the following detailed description of the invention when considered in conjunction with the accompanying drawings.

DETAILED DESCRIPTION OF THE DRAWINGS

Figure 1A:
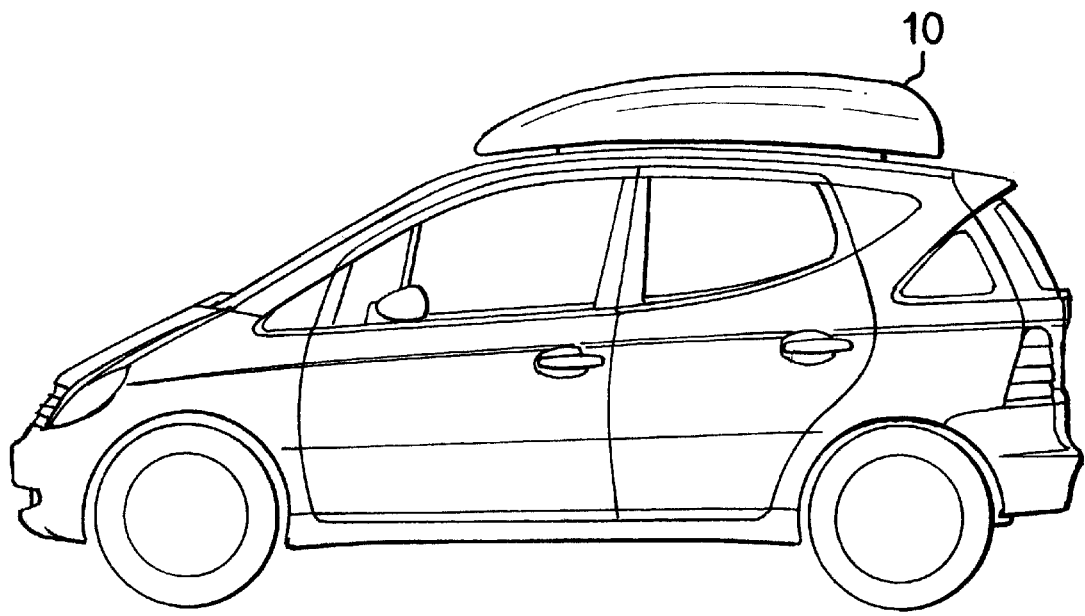
FIGS. 1*a* and *b* show side and top views of an electric vehicle according to the invention.
Figure 1B:
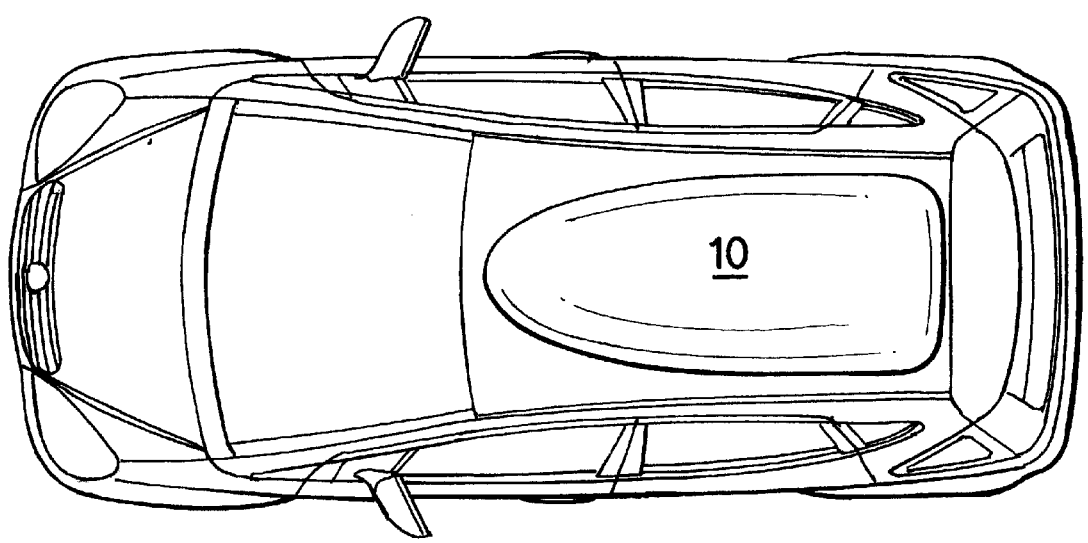

FIGS. 1*a* and *b* illustrate an electric vehicle according to the invention in two views. In the interior of the vehicle an energy source (such as a traction battery or a fuel cell, not shown) is situated for driving the vehicle. According to the invention, an additional energy supply unit 10 is arranged on the roof of the vehicle in a compact closed construction for increasing the vehicle range. The outer, aerodynamically optimized shape of the energy supply unit corresponds to that of a closed roof rack. For the fastening on the vehicle roof, fastening systems known for roof racks can be used without any significant change. For storage purposes, the energy supply unit can easily be removed from the roof of the vehicle and, for example, hung up or placed on a stand.

Figure 2:
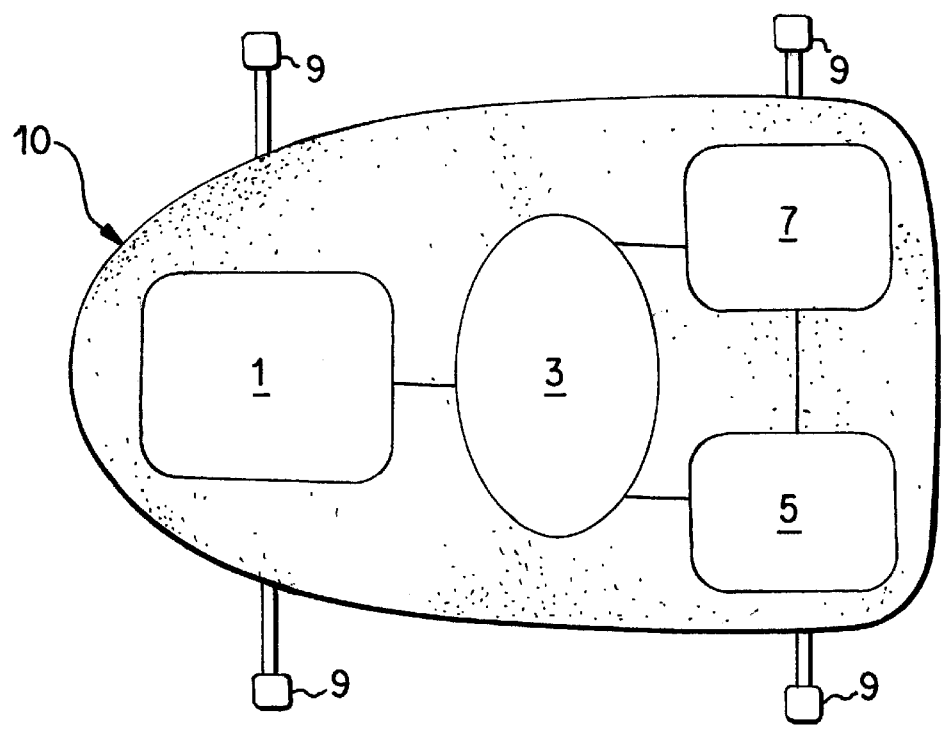
FIGS. 2 and 3 are views of an energy supply unit for an arrangement on the vehicle roof of the electric vehicle.

FIG. 2 is a detailed view of the construction of the energy supply unit 10. As an important component of this unit, the current source 1 can be constructed, for example, as follows:

Fuel cell, particularly a PEM (proton exchange membrane) fuel cell can be provided. The fuel cell produces direct current at a high efficiency. For this purpose, the reaction gases hydrogen and water are fed on both sides of a membrane. A hydrocarbon, which is converted to hydrogen in a reforming reaction in a reformer, can be used as the fuel for the fuel cell. However, it is also possible to carry hydrogen along in a tank and to feed it to the fuel cell.

Battery of the type having a galvanic element, such as an NiCD battery can be provided. This battery supplies electric energy from stored chemical energy. Advantageously, a rechargeable battery can be used.

Generator. This type of an embodiment is described in detail in FIG. 3.

The direct current supplied by the current source 1 is transformed in the current transformer 3 to a form required for the electric motor in the vehicle (direct current, alternating current, rotary current). By way of a vehicle interface 5, the current is finally transmitted to the consuming device in the vehicle. This may be a simple plug-type connection which can be unplugged when the energy supply unit 10 is removed from the vehicle roof.

The fixing of the whole unit on the vehicle roof takes place at the four fastening points 9. In an advantageous embodiment, the type of fastening may be compatible with already commercially available fastening systems for roof racks.

The unit 7 is used for controlling (including automatically controlling) the current transformer and the current source, particularly with respect to the current parameters frequency, voltage and current limiting.

Figure 3:
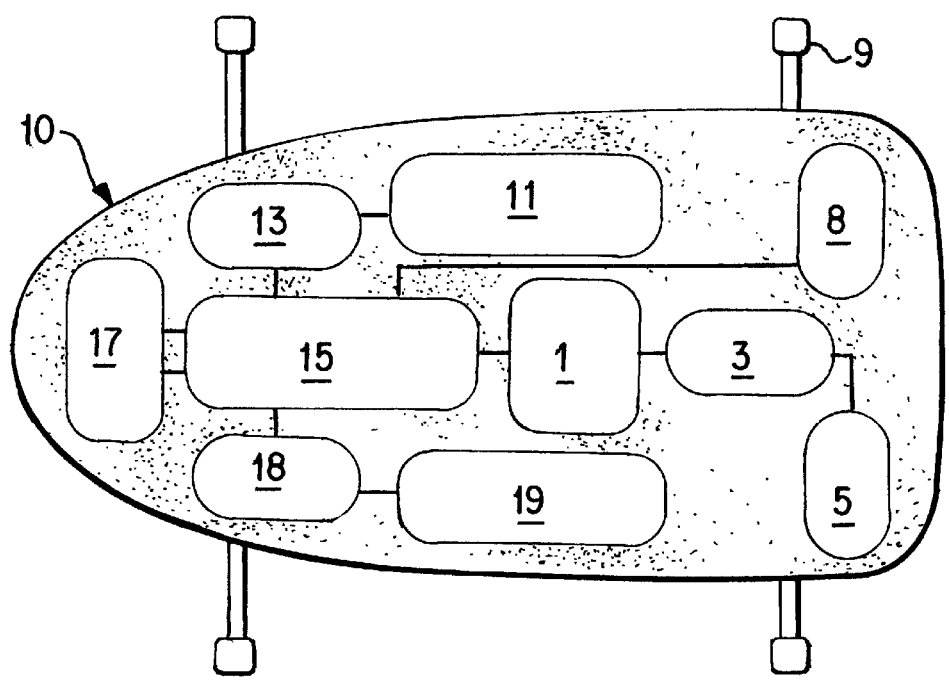

FIG. 3 illustrates an energy supply unit 10 according to the invention, in which the current required for driving the vehicle is generated by means of a generator 1. The generator 1 is coupled with an internal-combustion engine 15, such as a gasoline or diesel engine. The fuel for the internal-combustion engine 15 is available in the fuel tank 11 and is fed by means of the fuel pump 13. A radiator 17 is provided for cooling the internal-combustion engine 15. The air stream of the vehicle can advantageously be utilized for the cooling. For reducing the pollution and noise emissions, a catalyst 18 as well as a muffler 19 may be provided which are also integrated in the energy supply unit 10 situated on the vehicle roof. The unit 8 is used for the control and automatic control of the internal-combustion engine 15. Reference number 5 indicates the interface to the electric vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrically propelled vehicle, comprising:
   a vehicle body having a roof;
   at least one closed construction modular energy supply unit arranged on the vehicle roof; and
   roof rack unit which is removably attachable to the vehicle roof, and which removably mounts said closed construction modular energy supply unit to said vehicle roof.

2. Electric vehicle according to claim 1, wherein:
   the vehicle has a main energy supply unit arranged inside the vehicle body; and
   the at least one energy supply unit removably arranged on the vehicle roof is a supplementary energy supply for increasing a traveling range of the electric vehicle.

3. Electric vehicle according to claim 1, wherein the at least one energy supply unit removably arranged on the vehicle roof is a main energy supply unit of the electric vehicle.

4. Electric vehicle according to claim 1, wherein the at least one energy supply unit removably arranged on the vehicle roof comprises a fuel cell.

5. Electric vehicle according to claim 4, wherein the fuel cell is a PEM fuel cell.

6. Electric vehicle according to claim 1, wherein the at least one energy supply unit removably arranged on the vehicle roof comprises a battery.

7. Electric vehicle according to claim 1, wherein the at least one energy supply unit removably arranged on the vehicle roof comprises a generator.

8. Electric vehicle according to claim 7, wherein the generator is driven by means of an internal-combustion engine.

9. Electric vehicle according to claim 1, wherein the at least one energy supply unit removably arranged on the vehicle roof comprises a current transformer by means of which electric energy supplied by a current source of the energy supply unit is transformed into a form suitable for driving the electric vehicle.

10. An electric energy supply arrangement for an electrically propelled vehicle comprising:
    at least one closed construction electric energy supply module which is removably mountable on a roof of said electrically propelled vehicle; and
    a roof rack unit which is removably attachable to the vehicle roof, and which removably mounts said closed construction energy supply module to said vehicle roof.

11. An electric energy supply arrangement for an electrically propelled vehicle according to claim 10, wherein:
    said vehicle has a main energy supply situated inside the vehicle body; and
    said at least one electric energy supply module is a supplemental energy supply which can be selectively connected to supply electric energy to the vehicle.

12. An electrically driven vehicle having a closed construction electrical energy supply module for driving the vehicle detachably mounted on a roof thereof.

13. An electric vehicle comprising:
    a main energy supply unit mounted inside a vehicle body of said vehicle;
    a closed construction modular supplemental energy supply unit detachably mounted on a vehicle roof of said vehicle.

* * * * *